Dec. 7, 1926.
H. T. KRAFT
PONY BLIMP
Filed August 11, 1925      2 Sheets-Sheet 1
1,609,517
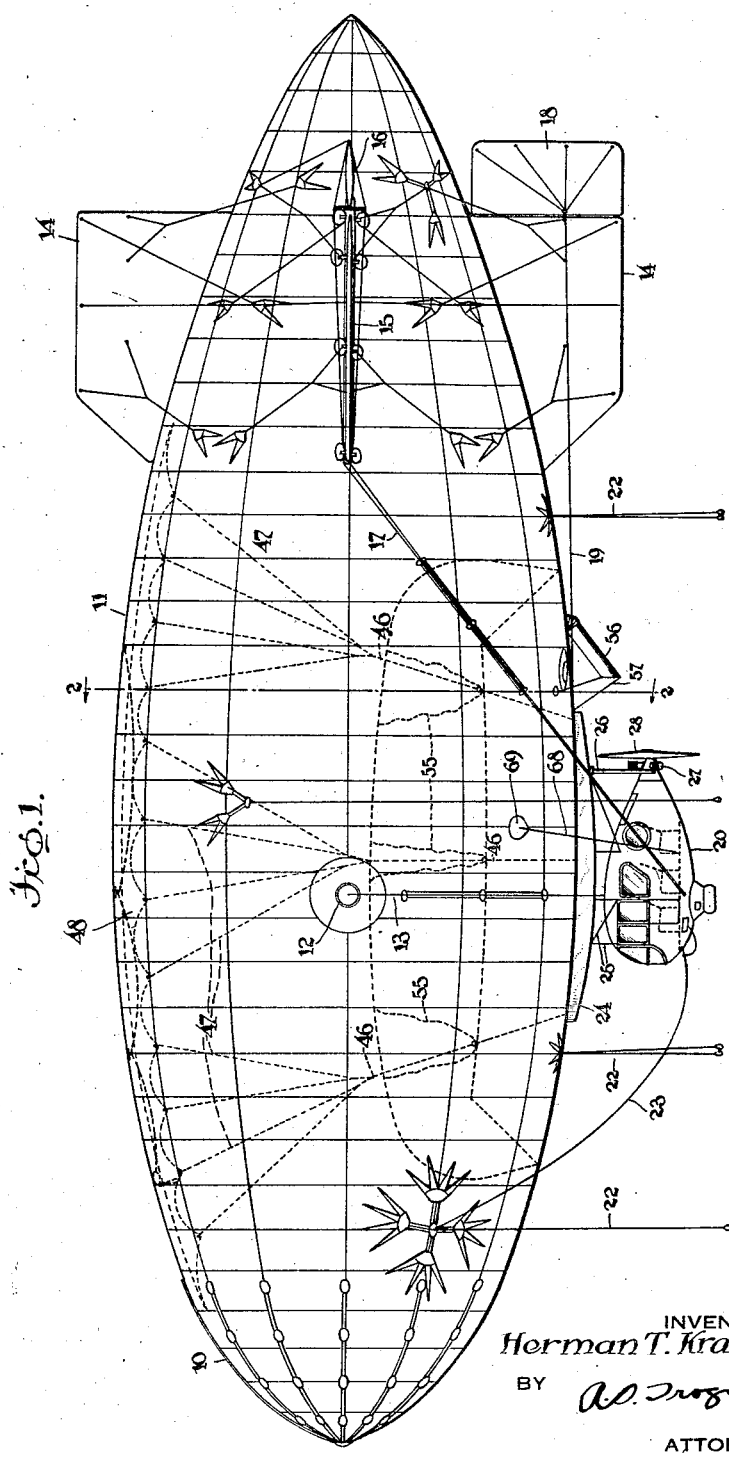
INVENTOR
Herman T. Kraft,
BY
ATTORNEY Dec. 7, 1926.
H. T. KRAFT
PONY BLIMP
Filed August 11, 1925
1,609,517
2 Sheets-Sheet 2
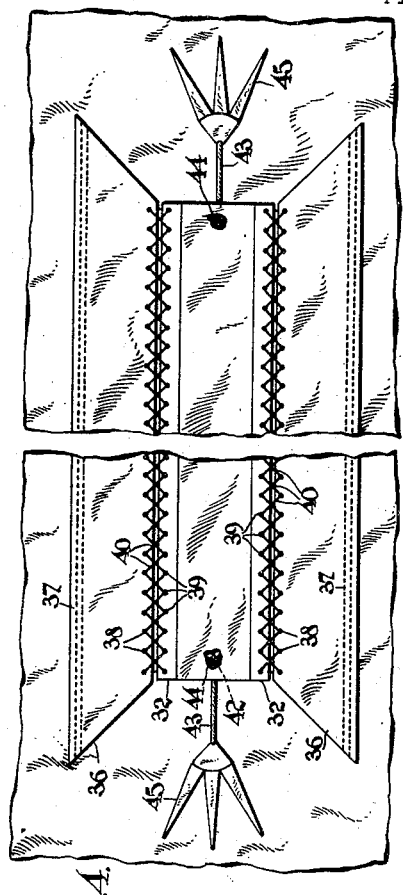
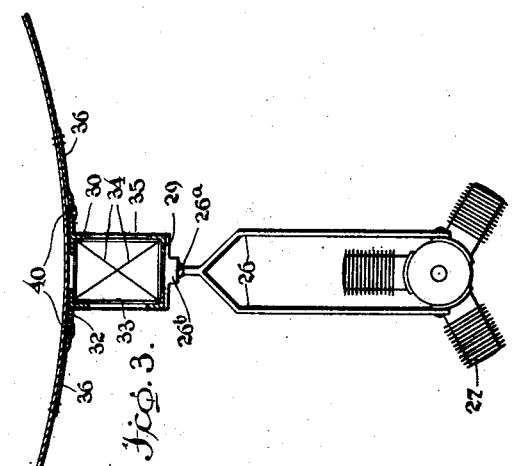
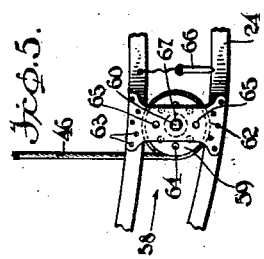
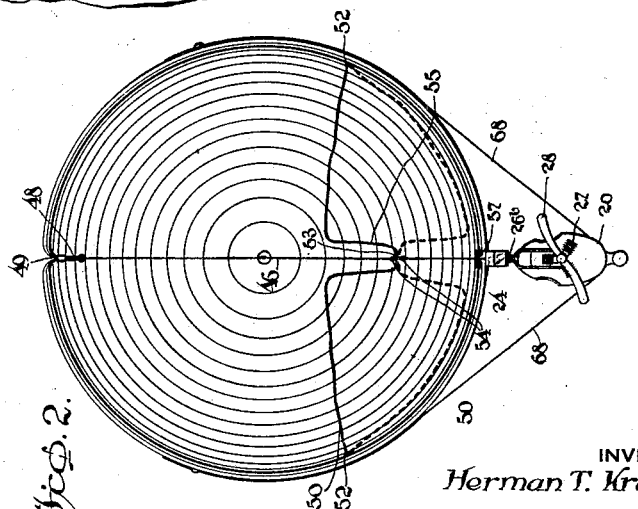
INVENTOR
Herman T. Kraft,
BY
ATTORNEY Patented Dec. 7, 1926.

1,609,517

UNITED STATES PATENT OFFICE.

HERMAN T. KRAFT, OF AKRON, OHIO, ASSIGNOR TO THE GOODYEAR TIRE & RUBBER COMPANY, OF AKRON, OHIO, A CORPORATION OF OHIO.

PONY BLIMP.

Application filed August 11, 1925. Serial No. 49,568.

My present invention relates to improvements in aircraft and it has particular relation to suspension apparatus adapted to be employed in connection with non-rigid dirigible aircraft.

One object of my invention is to provide improvements for aircraft which will simplify the suspension of the control-car of non-rigid dirigible airships by eliminating exterior suspension wires.

Another object of my invention is to provide a novel suspension apparatus which will distribute over a relatively large area of the envelope of an aircraft, the stresses set up therein due to the weight of the motor and car.

Still another object of my invention is to provide improvements in suspension apparatus for non-rigid aircraft which will eliminate exterior suspension wires and at the same time prevent torque reactions incident to the operation of the aircraft motor.

Dirigible aircraft of the non-rigid type, as heretofore constructed, are generally provided with control or pilot cars suspended by means of a number of wires secured to finger patches distributed over considerable area of the lower surface of the envelope, or by numerous suspension lines disposed circumferentially over top and sides of the envelope. The number of wires necessary to properly suspend loads to be carried present an intricate net work of suspension members and the control car must be spaced a considerable distance from the lower surface of the envelope in order to reduce the stresses tending to buckle the aircraft upwardly adjacent to the middle portion. In case gas pressure in the envelope becomes low, there is a strong tendency for its shape to become bowed at the central portion because of the forces exerted by the suspension wires pulling from the ends of the aircraft toward its center. Also the greater the distance between the envelope of the aircraft and the control car, the greater will be the impediment to speed, and the more will be the difficulty encountered in steering.

An aircraft constructed in accordance with the principles of my invention will obviate the disadvantages above mentioned and is so designed that a relatively small number of suspension members will efficiently support the car immediately below the lower part of the envelope. By eliminating the numerous suspension lines, the appearance of the aircraft is materially improved in smoothness of surface and regularity of outline. Air resistance is reduced because of the compactness of the structure. This form of suspension is peculiarly applicable to the smaller type of aircraft, such as those known as the "pony blimp," although it is not limited to this type.

My improved suspension consists generally in a relatively short beam or truss member which is secured to the lower surface of the envelope and a plurality of suspension lines connected at intervals to a beam and to a catenary disposed longitudinally along the interior upper portion of the envelope. The suspension lines extend through a ballonet which is so constructed and connected to the lines that it may be inflated or deflated without interference to the lines or without danger of exhausting gas from the envelope. Immediately below the beam or truss member, a pilot or control car is attached by means of relatively short wires or cables.

For a better understanding of my invention, reference may now be had to the accompanying drawings forming a part of this specification, in which:

Fig. 1 is a side-elevational view of an aircraft embodying my invention;

Fig. 2 is a cross sectional view taken substantially on the lines 2—2 of Fig. 1;

Fig. 3 is a fragmentary cross-sectional view, on a larger scale, illustrating details of construction;

Fig. 4 is a fragmentary view, on a larger scale, illustrating the manner of connecting a suspension beam to the envelope of an aircraft; and Fig. 5 is a similar fragmentary view of an adjusting device for the suspension lines of an aircraft.

In practicing my invention, I have incorporated the novel features thereof in a non-rigid type of aircraft designated by the numeral 10. The aircraft structure includes the usual form of fabric envelope 11 provided with a gas manhole and valve, indicated at 12, the latter being provided with an actuating cord 13. Vertical stabilizing fins 14 are secured to the upper and lower portions of the envelope. Horizontal fins 15 are secured to the sides of the envelope, such fins being provided with elevators 16 actuated by means of elevator control cables 17 for impressing a pitching moment on the aircraft. A rudder 18 is secured to the lower vertical fin and is operated by means of rudder control cables 19, the elevator and rudder control cables being connected in the usual manner to a conventional control or pilot car 20 which is suspended from the envelope. Handling lines 22 and a mooring line 23 are provided for handling the aircraft at or near the ground.

My model suspension means includes a beam or truss 24 which is provided with relatively short cables 25 for suspending the car from the beam. At one end of the car I provide a plurality of strut members 26 which converge adjacent their upper ends to form an integral ball connection 26ª, which is disposed in a conventional manner in a cooperating socket 26ᵇ. The lower ends of the members 26 are secured to the car adjacent the power unit thereof, which unit consists of the usual motor 27 and propeller 28. The strut members 26 serve the function of preventing torque re-actions incident to the operation of the motor.

The beam or truss member 24 is formed of a number of angle members 29 and 30 of light weight material, the lower members 29 having flanges extending inwardly and the upper members 30 having flanges 32 extending outwardly. The usual reinforcing truss members 33 and 34 brace the beam to insure strength and rigidity. In order to protect the truss member from exposure and to improve its appearance, a fabric covering 35 is disposed thereover in the usual manner.

Two strips of strong fabric, indicated at 36 in Fig. 4, are disposed on each side of the beam, one edge of each strip being secured to the envelope by means of stitching 37, while the other edge is provided with a plurality of eyelets 38. The out-turned flanges 32 of the truss member are also provided with openings 39 corresponding to the eyelets and cooperating therewith to fasten the strips and beam together by means of cord or cable laces 40. Each end of the beam is provided with an opening 42 for receiving a short piece of cable or rope 43 which is so knotted at one end, as indicated at 44, as to be maintained in the opening, and at the other end is secured to a finger patch 45 cemented to the envelope. These cables are for the purpose of stabilizing the beam with respect to the envelope, especially to prevent relative longitudinal movement, while the fabric strips prevent relative lateral movement.

A plurality of suspension cables 46 are secured adjacent the ends and intermediately of the beam at their lower ends and at their upper ends are provided with a number of auxiliary lines 47 arranged in crowfoot configuration and connected at spaced intervals to a catenary 48 carried in the upper portion of the aircraft. In order to provide a suitable securing portion for the auxiliary lines, the upper part of the envelope is drawn inwardly into the form of a fold 49, to which the catenary is cemented or otherwise firmly secured.

It will be seen from this construction that the beam or truss together with the control car is suspended in a substantially vertical plane along the interior top portion of the envelope and the stresses are distributed over substantially the whole length of the envelope. This construction prevents any tendency of the envelope to become distorted by the longitudinal axis becoming convex upwardly or drooping at both ends, which disadvantage is common to the older type of aircraft, especially when internal gas pressure has been reduced.

In the lower central portion of the envelope, I have provided a ballonet 50 which is secured to the interior of the envelope at 52, and provided with an attaching member 53 including rings 54 secured to and forming a part of the suspension lines. In order to provide for free inflation and deflation of the ballonet without interfering with the suspension lines, I have devised for the ballonet, an integral sleeve or pants-leg 55, through which the suspension lines extend, the member 53 forming a gas-tight closure at one end of the pants-leg, the other end remaining open. It will be noted that the suspension lines are broken and attached on either side of the ballonet in the rings 54. As shown in Fig. 2, when the ballonet 50 is inflated, it assumes the configuration indicated in full lines and when it is deflated, it assumes the position indicated in dotted lines. From this figure it will be seen that the closed end of the pants-leg remains in substantially the same position while the ballonet is freely deflated and inflated. The ballonet is inflated by means of the usual air scoop 56, which is controlled by the pilot through the medium of a line or cable 57 communicating with the control car.

The lower ends of the suspension lines extend through glands 57 secured to the fabric of the envelope, thus permitting of adequate play or adjustment of the suspension lines, under conditions of maximum and minimum inflation or distortion of the envelope.

I have provided a novel adjusting device 58 for the suspension lines in the form of a reel 59 for each suspension line, as indicated in Fig. 5. A shaft or rod 60 keyed to the reel is journalled upon a cross member 62 riveted at 63 to the beam 24, the suspension lines being secured to and wound around the reel. The reel is provided with a plurality of holes 64 which are adapted to register with holes 65 in the cross member and the reel is adapted to be held in adjusted position by a pin 66 inserted through the registering openings. The journal bolt on which the reel is rigidly mounted is provided with a square head 67 which is adapted to receive a wrench in order that the reel may be manually rotated to any adjusted position.

If it is desired to provide stabilizing members for the control car in addition to the cables 25 and struts 26, two or more wires or cables 68 may be secured to the control car and to patches 69 cemented to the envelope. However, efficient functioning of my improved suspension system is not dependent upon these additional wires and they may be omitted without materially affecting the application of my invention as described.

Although I have illustrated but one form which my invention may assume and have described in detail but a single application thereof, it will be apparent to those skilled in the art that it is not so limited, but that various minor modifications and changes may be made therein without departing from the spirit of my invention or from the scope of the appended claims.

What I claim is:

1. A non-rigid aircraft comprising an elongate envelope having a car disposed therebeneath, a ballonet disposed within the lower portion of the envelope, a beam secured to the lower portion of the envelope, said beam being of less length than the ballonet and suspension means attached to the top of the envelope and to the beam for supporting the weight of the car.

2. A non-rigid aircraft comprising an elongate envelope having a car disposed therebeneath, a ballonet disposed within the lower portion of the envelope, a metal beam secured to the lower portion of the envelope and serving solely as a car supporting and stabilizing medium, said beam being of less length than the ballonet and cables attached adjacent the top of the envelope and to the beam for supporting the weight of the car and beam from the top of the envelope.

3. A non-rigid aircraft comprising an elongate envelope having a car disposed therebeneath, a metal beam secured to the lower portion of the envelope and serving solely as a car supporting and stabilizing medium and spaced cables arranged in a vertical plane attached adjacent the top of the envelope and to the beam for supporting the weight of the car and beam from the top of the envelope.

4. A non-rigid aircraft comprising an elongate envelope having a car disposed therebeneath, a truss member provided with means for lacing it to the envelope, the length of the truss member being less than twice the length of the car and suspension means arranged in a vertical plane attached adjacent the top of the envelope and to the truss member for sustaining the weight of the car and truss member.

5. A non-rigid aircraft comprising an envelope having a car disposed therebeneath, an elongate rigid member secured to the lower portion of the envelope, suspension means attached adjacent the top of the envelope and to the rigid member and means including rigid members provided with a universal joint connected to the car and to the rigid member for steadying the car with respect to the rigid member.

6. A non-rigid aircraft comprising an elongate envelope having a car disposed therebeneath, an elongate rigid member extending less than twice the length of the car and secured to the lower portion of the envelope, suspension means attached adjacent the top of the envelope and to the rigid member and suspension means including rigid struts connected to the car and to the rigid member for steadying the car with respect to the rigid member.

7. A non-rigid aircraft comprising an envelope having a car disposed therebeneath, suspension means arranged in a vertical plane for sustaining the weight of the car and a ballonet within the envelope provided with elongate portions adapted to be secured to the suspension means.

8. A non-rigid aircraft comprising an envelope having a car disposed therebeneath, a ballonet within the lower portion of the envelope, suspension means attached to the interior of the envelope adjacent the top thereof passing through the ballonet, and means permitting free inflation and deflation of the ballonet without interfering with the suspension means.

9. A non-rigid aircraft comprising an envelope having a car disposed therebeneath, a ballonet within the lower portion of the envelope, suspension lines attached adjacent the top of the envelope passing through the ballonet, the ballonet being provided with elongate sack portions closed at one end attached to each suspension line for permitting free inflation or deflation of the ballonet without interfering with the suspension lines.

10. A non-rigid aircraft comprising an elongate envelope having a car disposed therebeneath, a relatively short beam disposed along the envelope centrally between the ends thereof for supporting the car, glands provided in the lower portion of the envelope and suspension lines attached adjacent the top of the envelope passing through the glands for sustaining the weight of the car and beam.

11. A non-rigid aircraft comprising an envelope having a car disposed therebeneath, a ballonet within the envelope, glands provided in the lower portion of the envelope and suspension lines attached adjacent the top of the envelope passing through the ballonet and slidable in the glands for supporting the weight of the car.

12. A non-rigid aircraft comprising an envelope, a beam carrying a car secured to the lower portion of the envelope, the ends of the beam being spaced a distance greater than the length of the beam from the respective ends of the envelope, suspension means arranged in a vertical plane connected adjacent the top of the envelope and connected to said beam and means connected to the ends of the beam in alignment therewith and to the envelope for preventing longitudinal movement of the beam with respect to the envelope.

13. A non-rigid aircraft comprising an envelope, a beam carrying the car secured to the lower portion of the envelope, suspension means arranged in a vertical plane adjacent the top of the envelope connected to the beam, stabilizing members secured to the ends of the beam and to finger patches adjacent said ends for preventing longitudinal movement of the beam with respect to the envelope.

14. A non-rigid aircraft comprising an envelope, a beam carrying a car secured to the lower portion of the envelope, spaced suspension lines attached adjacent the top of the envelope and to the beam and means on the beam for adjusting the suspension lines.

15. A non-rigid aircraft comprising an envelope, a beam carrying a car secured to the lower portion of the envelope, spaced suspension lines attached adjacent the top of the envelope and to the beam and means for varying the length of each of the suspension lines including adjustable reels journalled to the beam.

In witness whereof, I have hereunto signed my name.

HERMAN T. KRAFT.